Patented June 9, 1925.

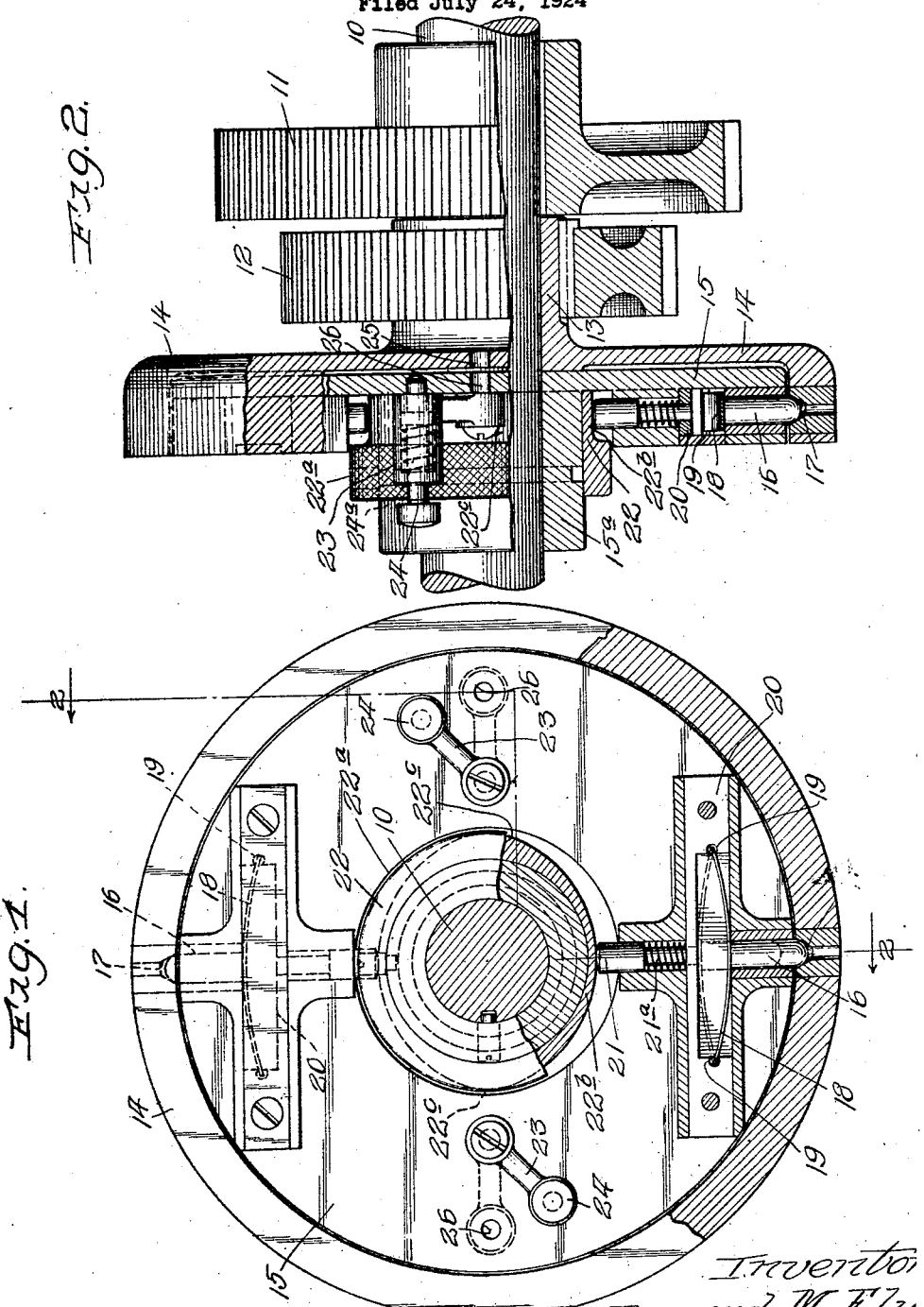

1,541,489

UNITED STATES PATENT OFFICE.

BERNARD M. ELY, OF MARSHALL, MICHIGAN, ASSIGNOR TO LAMBERT MACHINE COMPANY, OF MARSHALL, MICHIGAN, A CORPORATION OF MICHIGAN.

POWER-TRANSMITTING MECHANISM.

Application filed July 24, 1924. Serial No. 728,016.

*To all whom it may concern:*

Be it known that I, BERNARD M. ELY, a citizen of the United States, residing at Marshall, in the county of Calhoun and State of Michigan, have invented a new and useful Improvement in Power-Transmitting Mechanism, of which the following is a specification.

This invention relates to improvements in power transmitting mechanism and is here shown as embodied in a device especially adapted, for example, in connection with the driving of a grinding machine such as a coffee grinding machine. One of the objects of my invention is to provide a yieldable device for transmitting power from one point to another, insuring the safety of any or all parts of a machine to which it may be attached. For example, in driving a coffee grinding machine, the power may be transmitted through my improved mechanism so that if the grinding burrs become jammed, or if an undue resistance is met through other causes, the power transmitting mechanism will yield or slip, thus preventing breakage or damage to the burrs or other parts.

Although I have stated that my power transmitting mechanism is especially adapted for use in connection with driving grinding machines, it is apparent that, without detracting from the spirit of my invention, the same may be embodied in any kind of power transmitting mechanism where it is desired to provide a slippage or release adapted to operate automatically when undue resistance is met.

In that form of device embodying the features of my invention shown in the accompanying drawings, Figure 1 is a view in front elevation of the power transmitting mechanism, and Figure 2 is a vertical sectional view of the same.

As shown in the drawings, 10 indicates a driven shaft adapted to turn the sprocket 11 mounted thereon which is adapted to be meshed with the mechanism of the grinding machine or any other devices which it is intended to operate. 12 indicates the driving sprocket.

In general, it may be stated at this point that the driving sprocket 12 is mounted on the hub 13 of the cup-shaped disk 14. The disk 14 is loosely mounted on the shaft 10. The shaft 10 also carries tightly mounted thereon the disk 15 lying within the cup of the cup-shaped disk 14. The tight disk 15 carries two driving or locking pins 16 adapted to lock the disks together or permit the disk 14 with the sprocket 12 to rotate freely on the shaft 10. In general, then, it may be stated that when the locking or driving pins 16 are in their driving position, which is outward, the disk 14 is locked to the disk 15 so that the shaft 10 will be driven by the sprocket 12. When the pins 16 are in their unlocked position, which is inward, the disk 14 is permitted to revolve freely on the shaft 10 (with the exception of positive locking means to be hereinafter described).

The pins 16 are radially mounted on the disk 15 and adapted to slide inwardly or outwardly in suitable guides which are provided. The inner surface of the periphery of the cup part of the disk 14 is provided with two beveled sockets 17 adapted to be engaged by the outer ends of the pins 16 when they are in their outer or locked position. The outer ends of the pins 16 are rounded as shown. Adjacent the inner end of each of the pins 16 and bearing against the same is an elliptical spring 18 having its ends mounted in the sockets 19 in the spring retaining plates 20 fastened to the disk 15. Each of the springs 18 is flexed so that when in the position shown in Fig. 1, it will yieldingly press the pin 16 outwardly. It is mounted loosely enough, however, in the sockets 19 so that the pin 16 may be pressed inwardly until the spring 18 snaps to the inner side of the center, whereupon obviously it will cease to press the pin outwardly. In Fig. 1, the lower pin and spring are shown in broken lines in the positions they occupy when the pin is in, in its unlocked position. The pins 16 are diametrically arranged, and their operation and construction, with associated parts, are similar.

In alinement with each of the driving pins 16, there is also arranged, as shown, a resetting pin 21 which is yieldingly pressed inwardly by a spiral spring 21$^a$ as shown. Rotatably mounted on the hub 15$^a$ of the disk 15 is a collar 22 having a knurled part 22$^a$ to permit of its rotation by hand. The inner part of the collar 22, as indicated by 22$^b$, has two diametrically arranged raised cam surfaces as indicated by 22$^c$. The cam surfaces are adapted to engage the pins 21 upon rotation of the collar 22. The cam surfaces are so shaped that when the collar 22 is in the position shown in Fig. 1, the resetting pins 21 will be in their innermost positions. When the collar is rotated 90°, the two raised portions 22$^c$ will engage the pins 21 to force the same outwardly. The outward movement of the resetting pins 21, 21 will engage the springs 18 when they are in their inner positions (for example, as shown by the lower one in the position in Fig. 1 indicated by the broken lines) and force the same outwardly until they pass the centers and snap outwardly to force the driving pins 16 into their outermost or driving positions.

The disk 15 also carries pivotally mounted thereon a pair of short arms 23, each carrying at its end a pin 24 yieldingly pressed inwardly by a spring 24$^a$. The disks 14 and 15 are provided with holes 25 and 26, respectively, adapted to register when the driving pins 16 are in engagement with the sockets 17. When the pin 24 is not in the holes 25, 26, it may be held out of position to one side where it rests in a depression in the disk 15 as it is shown in Fig. 2.

In the operation of the device, power is transmitted to the disk 15 from any desired source. When in driving position, the rounded ends of the pins 16 are in the sockets 17. The two disks 14 and 15 rotate together until an extra strain is produced, which disengages the driving pins 16 from the sockets 17 so that the loose disk 14 revolves with the motor or other power loosely on the shaft while the shaft remains stationary. The driving pins are yieldingly held in position by the elliptical springs 18 until they are forced out of the sockets 17 by any undue pressure. When thus forced out of their sockets they are pressed inwardly until the springs 18 snap to their inner positions and the pins 16 then stay in the inner positions until they are again forced back to their original driving position. The resetting of the driving pins is accomplished by turning the hand wheel 22$^a$ in either direction until the raised surfaces 22$^c$ force the resetting pins 21 outwardly to snap the springs 18 into their outer positions thus forcing the pins 16 outwardly into their driving position.

In resetting the driving pins it is necessary to bring both the stationary and revolving disks to a position where the pins 16 will enter the sockets 17. For this purpose, the locating device is used comprising the pin 24. The arm 23 is swung until the pin 24 enters the hole 26 in the disk 15. The loose disk 14 is then rotated until the hole 25 registers with the hole 26 when the pin 24 will snap into the hole 25. When in this position the sockets 17 are in position to receive the driving pins 16. After the driving pins have been reset, the locating pin 24 is pulled out of the holes 25 and 26, and the arm 23 swung to one side and the end of the pin 24 allowed to rest in the depression in the disk 15 to keep it out of the way.

The locating device including the pin 24 answers a double purpose. In the first place, it is used, as above described, to properly position the two disks 14 and 15 so that the pins 16 will enter the sockets 17, and consequently, the pin 24 may be used for holding the two disks firmly together and positively locking the same in the event that for any reason it is desired to dispense with the automatic releasing mechanism.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. A device of the character described, comprising; a shaft; a loose disk mounted thereon; a tight disk on the shaft arranged adjacent the loose disk; a slidable driving pin carried by the tight disk, said pin adapted to be slid inwardly or outwardly; spring means for yieldingly holding said pin in its inner or outer position; a socket in the loose disk adapted to be engaged by the driving pin when in its outer position; and means for manually moving said pin from its inner to its outer position, said means including, a resetting pin adapted to move the driving pin and a rotatable collar surrounding the shaft having a cam surface adapted to engage the inner end of said resetting pin and force the same outwardly upon rotation of said collar.

2. A device of the character described comprising; a shaft; a loose disk mounted thereon; a tight disk on the shaft arranged adjacent the loose disk; a slidable driving pin carried by the tight disk, said pin adapted to be slid inwardly or outwardly; spring means for yieldingly holding said pin in its inner or outer position; a socket in the loose disk adapted to be engaged by the driving pin when in its outer position; means for manually moving said pin from its inner to its outer position; and means for properly locating the socket in the loose disk with respect to the driving pin.

3. A device of the character described comprising; a shaft; a loose disk mounted thereon; a tight disk on the shaft arranged adjacent the loose disk; a slidable driving pin carried by the tight disk, said pin adapted to be slid inwardly or outwardly; spring means for yieldingly holding said pin in its inner or outer position; a socket in the loose disk adapted to be engaged by the driving pin when in its outer position; means for manually moving said pin from its inner to its outer position; and means for properly locating the socket in the loose disk with respect to the driving pin, said means comprising a hole in the loose disk adapted to be brought into registry with a hole in the tight disk and a pin adapted to be inserted in said holes.

4. A device of the character described comprising; a shaft; a driving member mounted on the shaft; a driven member arranged adjacent the driving member; a slidable driving pin carried by the driving member, said pin adapted to be moved from operative to inoperative position and vice versa; spring means for yieldingly holding said pin in its operative or inoperative position; a socket in the driven member adapted to be engaged by the driving pin when in its operative position; and means for manually moving said pin from its inoperative to its operative position, said means including a resetting pin adapted to move the driving pin and a rotatable collar surrounding the shaft having a cam surface adapted to engage said resetting pin and move the same upon rotation of said collar.

5. A device of the character described comprising; a shaft; a driving member mounted on the shaft; a driven member arranged adjacent the driving member; a movable driving pin carried by the driving member, said pin adapted to be moved from operative to inoperative position and vice versa; spring means for yieldingly holding said pin in its operative or inoperative position; a socket in the driven member adapted to be engaged by the driving pin when in its operative position; means for manually moving said pin from its inoperative to its operative position; and means for properly locating the socket in the driven member with respect to the driving pin.

6. A device of the character described comprising; a shaft; a driving member carried by the shaft; a driven member arranged adjacent the driving member; a slidable driving pin carried by the driving member, said pin adapted to be moved from operative to inoperative position and vice versa; spring means for yieldingly holding said driving pin in its operative or inoperative position; a socket in the driven member adapted to be engaged by the driving pin when in its operative position; means for manually moving said driving pin from its inoperative to its operative position; and means for properly locating the socket in the driven member with respect to the driving pin, said means comprising a hole in the driven member adapted to be brought into registry with a hole in the driving member and a pin adapted to be inserted in said holes.

7. A device of the character described comprising; a shaft; a driving member carried by the shaft; a driven member arranged adjacent the driving member; a slidable driving pin carried by the driving member, said pin adapted to be moved from operative to inoperative position and vice versa; a flat spring adapted to yieldably hold said pin in its operative position, said spring adapted to be pressed beyond its dead center upon movement of said pin to its inoperative position whereby said pin will remain in its inoperative position; and means for manually moving said pin from its inoperative to its operative position, said means including a resetting pin adapted to be moved into contact with said flat spring and press the same past its dead center while in contact with the driving pin whereby said driving pin is moved into operative position, and a rotatable collar surrounding the shaft having a cam surface adapted to engage said resetting pin and press the same against said spring upon rotation of said collar.

Witness my hand and seal this 21st day of July, A. D. 1924.

BERNARD M. ELY. [L. S.]